United States Patent
Shitara et al.

(10) Patent No.: US 11,091,101 B2
(45) Date of Patent: Aug. 17, 2021

(54) VEHICLE CAPABLE OF DRIVE ASSIST OR AUTOMATIC DRIVING

(71) Applicant: Toyota Jidosha Kabushiki Kaisha, Toyota (JP)

(72) Inventors: Masaki Shitara, Nagakute (JP); Yuchi Yamanouchi, Toyota (JP); Ryo Hattori, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/911,002

(22) Filed: Jun. 24, 2020

(65) Prior Publication Data
US 2020/0406835 A1    Dec. 31, 2020

(30) Foreign Application Priority Data

Jun. 28, 2019  (JP) .............................. JP2019-121195

(51) Int. Cl.
*B60R 11/04*  (2006.01)
*B60W 10/20*  (2006.01)
*B60R 11/00*  (2006.01)

(52) U.S. Cl.
CPC .............. *B60R 11/04* (2013.01); *B60W 10/20* (2013.01); *B60R 2011/004* (2013.01)

(58) Field of Classification Search
CPC ... B60R 11/04; B60R 2011/004; B60W 10/20
See application file for complete search history.

(56) References Cited

U.S. PATENT DOCUMENTS

| | | | |
|---|---|---|---|
| 2014/0330479 A1* | 11/2014 | Dolgov | B60W 30/143 |
| | | | 701/28 |
| 2016/0214607 A1 | 7/2016 | Dolgov et al. | |
| 2016/0272207 A1 | 9/2016 | Dolgov et al. | |

FOREIGN PATENT DOCUMENTS

JP    2017-214065 A    12/2017

OTHER PUBLICATIONS

Hecht, "Lidar for Self-Driving Cars," <https://www.osa-opn.org/home/articles/volume_29/january_2018/features/lidar_for_self-driving_cars/>, The Optical Society, Published Jan. 1, 2018, downloadable as 26-33_OPN_01_18.pdf, pp. 28-33 (Year: 2018).*
Agis F, "MC2 Self-Driving Vehicle," <https://wordlesstech.com/mc2-self-driving-vehicle/>, wordlessTech, Published May 18, 2018 (Year: 2018).*

* cited by examiner

*Primary Examiner* — Sath V Perungavoor
*Assistant Examiner* — Tyler B Edwards
(74) *Attorney, Agent, or Firm* — Dinsmore & Shohl LLP

(57) ABSTRACT

A vehicle capable of drive assist or automatic driving, comprises: a first sensor disposed intermediately in a vehicle width direction on at least one of front and rear surfaces of the vehicle and detecting an object therearound; bulging parts disposed on both sides of the at least one surface in the vehicle width direction and made up of a body bulging at least outward in a vehicle longitudinal direction; a connection surface that connects an outside surface in the vehicle width direction and an outside surface in the vehicle longitudinal direction of each of the bulging parts and that is an inclined surface or a round surface; and a second sensor arranged on the connection surface and detecting an object therearound.

3 Claims, 5 Drawing Sheets

VEHICLE CAPABLE OF DRIVE ASSIST OR AUTOMATIC DRIVING

CROSS REFERENCE TO RELATED APPLICATION

This application claims priority to Japanese Patent Application No. 2019-121195 filed on Jun. 28, 2019, which is incorporated herein by reference in its entirety including the specification, claims, drawings, and abstract.

TECHNICAL FIELD

This description discloses a vehicle equipped with a sensor detecting an object around the vehicle for drive assist or automatic driving.

BACKGROUND

A recently proposed vehicle is capable of drive assist in which some dynamic driving tasks of an automobile are partially performed at the vehicle side, or automatic driving in which all the dynamic driving tasks are performed at the vehicle side. Such a vehicle is provided with a sensor for detecting an object so as to obtain object information around the vehicle.

For example, JP 2017-214065 A discloses a vehicle having multiple types of sensors mounted thereon and performing automatic driving by using detection results of these sensors. The mounted sensors include any combination of global positioning system sensors, inertial measurement units, radar units, lidar units, cameras, lane detection sensors, and acoustic sensors. In JP 2017-214065 A, examples of mounting positions of these sensors include those on a ceiling of a vehicle, beside a headlight, and below a headlight.

However, the vehicles assumed in JP 2017-214065 A are only those having a general shape with four corners of the vehicle not protruding outward. On the other hand, some vehicles have front and rear wheels arranged as far out on the outer side as possible so as to ensure a wide vehicle cabin. In such a vehicle, portions (wheel arches) of a body surrounding the front and rear wheels bulge outward from peripheral portions. In other words, such a vehicle has bulging portions where portions of the vehicle body bulge outward at the four corners of the vehicle. Although such bulging portions affect a detection range of a sensor, no consideration was given in JP 2017-214065 A to arrangement of sensors in a vehicle having the bulging portions. Therefore, no technique has hitherto been known to enable a vehicle having the bulging portions to properly acquire object information around the vehicle.

Therefore, this description discloses a vehicle capable of properly acquiring object information around the vehicle even when the bulging portions exist.

SUMMARY

A vehicle disclosed in this description is a vehicle capable of drive assist or automatic driving, comprising: a first sensor disposed intermediately in a vehicle width direction on at least one of front and rear surfaces of the vehicle and detecting an object therearound; bulging parts disposed on both sides of the at least one surface in the vehicle width direction and made up of a vehicle body bulging at least outward in a vehicle longitudinal direction; a connection surface that connects an outside surface in the vehicle width direction and an outside surface in the vehicle longitudinal direction of each of the bulging parts and that is an inclined surface going outward in the vehicle width direction while extending toward the center in the vehicle longitudinal direction, or a round surface convex toward the outside of the vehicle; and a second sensor arranged on the connection surface and detecting an object therearound.

Since a corner of the bulging part is provided with the connection surface that is an inclined surface or a round surface, and the second sensor is disposed on the connection surface, an object can be detected in an area where a blind spot of the first sensor is formed by the bulging part. As a result, object information around the vehicle can be properly acquired even though the vehicle has the bulging parts.

The bulging parts may also bulge outward in the vehicle width direction, and the first sensor may also be disposed on an outside surface in the vehicle width direction on a center side in the vehicle longitudinal direction relative to the bulging parts.

With this configuration, an object can also be detected on the center side in the vehicle longitudinal direction relative to the bulging parts.

The second sensor may have a narrower detection range than the first sensor.

Costs can be reduced by using an inexpensive sensor with a narrow detection range as the second sensor.

The bulging parts may at least partially form wheel arches in which wheels are housed, and a position of an outer end of each of the wheels in the vehicle longitudinal direction may be substantially the same as a position of the at least one surface in the vehicle longitudinal direction.

With this configuration, a wide vehicle cabin space can be ensured.

According to the techniques disclosed in this description, the object information around the vehicle can be properly acquired even though the vehicle has the bulging parts.

BRIEF DESCRIPTION OF DRAWINGS

Embodiments of the present disclosure will be described based on the following figures, wherein.

DESCRIPTION OF EMBODIMENTS

Figure 1:
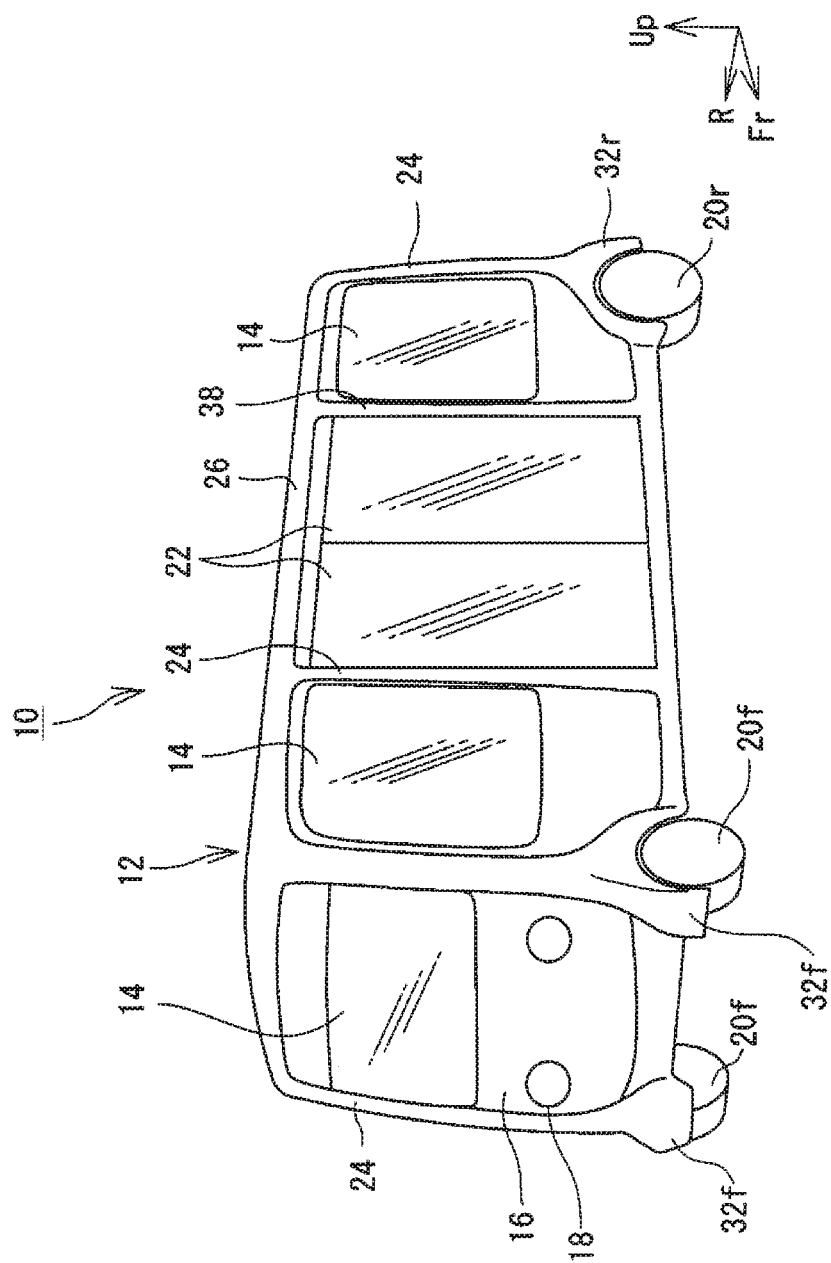
FIG. 1 is a perspective view of a vehicle viewed obliquely from the front.

A configuration of a vehicle 10 will now be described with reference to the drawings. In the drawings referred to in the following description, "Fr", "Up", and "R" indicate a front side in a vehicle longitudinal direction, an upper side in a vertical direction, and a right side in a vehicle width direction, respectively.

FIG. 1 is a perspective view of the vehicle 10 viewed obliquely from the front. The vehicle 10 is used as a bus for transporting passengers while running along a predetermined route at a specific site. It is noted that the form of usage of the vehicle 10 disclosed in this description can be changed as appropriate, and for example, the vehicle 10 may be used as a movable business space. For example, the vehicle 10 may be used as a store such as a retail store where various products are displayed and sold, or an eating place where food and drink are prepared and served. In another form, the vehicle 10 may be used as an office for clerical work, meetings with customers, etc. The vehicle 10 may be used as a taxi, a bus, or a transportation vehicle for transporting customers and luggage. The usage environment of the vehicle 10 is not limited to business, and for example, the vehicle 10 may be used as a personal transportation. A running pattern and a running speed of the vehicle 10 may be appropriately changed.

The vehicle 10 of this example has either a drive assist function in which the vehicle 10 performs some of the dynamic driving tasks, or an automatic driving function in which the vehicle 10 performs all the dynamic driving tasks. As used herein, the "drive assist" means level 1 or level 2 defined by Society of Automotive Engineers (SAE), for example. At level 1, the vehicle 10 supports either steering operation or acceleration/deceleration. At level 2, the vehicle 10 supports driving while coordinating both steering operation and acceleration/deceleration. The "automatic driving" means any one of levels 3 to 5 defined by SAE, for example. Level 3 is a driving mode in which all the dynamic driving tasks are automated in a specific place such as an expressway, although an operation by a driver is required during an emergency. Level 4 is a driving mode in which all the dynamic driving tasks are automated only in a specific place, and an emergency response is also automatically processed. Level 5 is a driving mode in which automatic driving can be performed under almost all conditions without restrictions on places etc. and means so-called "fully automatic driving".

The vehicle 10 is equipped with multiple types of sensors and communication devices to enable such drive assist or automatic driving. The sensor detects a running state of the vehicle 10 and a state of a surrounding environment of the vehicle. The vehicle 10 transmits/receives various items of information via the communication device to/from a centralized control center existing outside the vehicle and another vehicle 10. The vehicle 10 performs some or all of the dynamic driving tasks based on the information detected by the sensors and the information transmitted/received via the communication device.

The vehicle 10 is an electric vehicle having a motor for running as a prime mover, and a main battery (not shown) is mounted under a floor of the vehicle 10 for supplying electric power to the motor for running. As shown in FIG. 1, the vehicle 10 does not have a hood and a trunk, and has a substantially rectangular outer shape with front and rear surfaces rising substantially vertically. A box-shaped body 12 has, for example, a pillar 24 extending in the vertical direction of the vehicle and a rail 26 extending in the longitudinal direction at a boundary between a side surface and a top surface of the vehicle 10. Large window parts 14 are disposed on a side surface of the vehicle 10. A double sliding type door 22 sliding and opening/closing in the longitudinal direction of the vehicle is disposed at the center of the left side surface of the vehicle 10.

The front surface of the vehicle 10 is provided with a window part 14 functioning as a windshield and a lamp arrangement part 16 disposed under the window 14. A signal lamp 18 for notifying a person outside the vehicle by light of the presence and behavior of the vehicle is disposed in the lamp arrangement part 16. The rear surface of the vehicle 10 has substantially the same configuration as the front surface of the vehicle and has the window part 14 and the lamp arrangement part 16 arranged vertically.

The vehicle of this example has a pair of front wheels 20*f* arranged near a front end of the vehicle 10 and a pair of rear wheels 20*r* arranged near a rear end of the vehicle 10. The front wheels 20*f* and the rear wheels 20*r* are simply referred to as "wheels 20". The wheels 20 are arranged near the outer end surfaces in the vehicle longitudinal direction so as to ensure a wide vehicle cabin space. This will be described with reference to FIG. 2.

Figure 2:
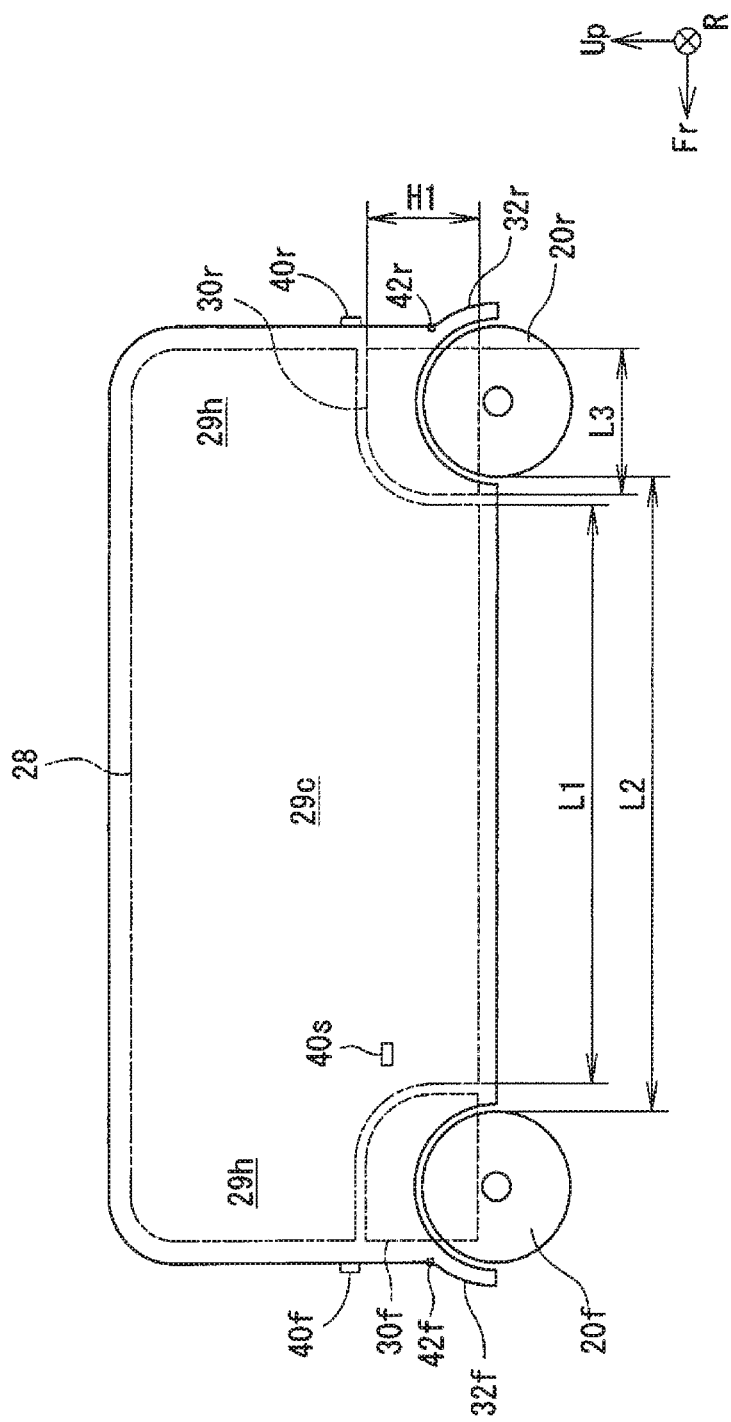
FIG. 2 is a schematic side view of the vehicle, showing a relationship between wheels and an internal space of the vehicle.
Figure 3:
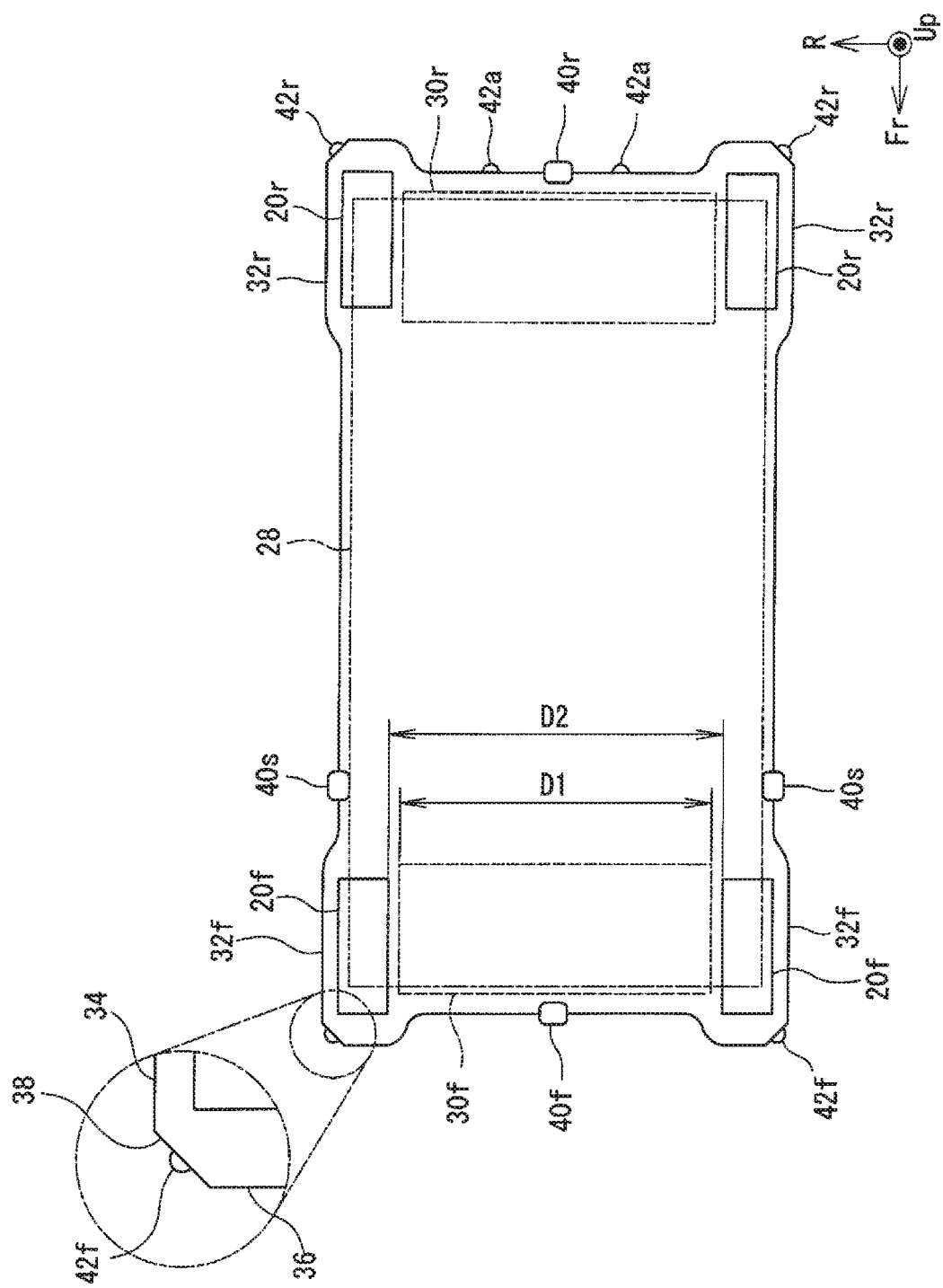
FIG. 3 is a schematic plan view of the vehicle, showing a relationship between the wheels and the internal space of the vehicle.

FIGS. 2 and 3 are drawings showing a relationship between the wheels 20 and an internal space of the vehicle 10, FIG. 2 is a schematic side view of the vehicle 10, and FIG. 3 is a schematic plan view of the vehicle 10. In this example, a front storage part 30*f* is disposed as a space separated from a vehicle cabin 28 between the paired front wheels 20*f* in a lower front portion of the vehicle 10. Similarly, a rear storage part 30*r* is disposed as a space separated from the vehicle cabin 28 between the paired rear wheels 20*r* in a lower rear portion of the vehicle 10. The prime mover, a suspension device, a steering device, a brake device, an electric device, etc. are stored in the front storage part 30*f* and the rear storage part 30*r*. In the following description, when the front and rear sides are not distinguished, the front storage part 30*f* and the rear storage part 30*r* are referred to as the "storage part 30" without suffixes f, r. Similarly, the suffixes f, r of other elements will also be omitted as necessary.

A front area and a rear area of the vehicle cabin 28 have a floor surface raised upward so as to avoid the storage part 30. The front area and the rear area of the vehicle cabin 28 having the raised floor surface are referred to as "high floor areas 29*h*". An area interposed between the two front and rear high floor areas is referred to as an "intermediate area 29*c*". The floor surfaces of the high floor areas 29*h* are used as seat surfaces on which an occupant sits facing the center in the vehicle longitudinal direction.

In this example, the wheels 20 are arranged as far to the outer side in the vehicle longitudinal direction, and to the outer side in the vehicle width direction, as possible. Specifically, the longitudinal positions of the front ends of the front wheels 20*f* are substantially the same as the longitudinal position of the vehicle front surface, and the positions of the outer end surfaces of the front wheels 20*f* in the vehicle width direction are substantially the same as the positions of the vehicle side surfaces in the vehicle width direction. Similarly, the longitudinal positions of the rear ends of the rear wheels 20*r* are substantially the same as the longitudinal position of the vehicle rear surface, and the positions of the outer end surfaces of the rear wheels 20*r* in the vehicle width direction are substantially the same as the positions of the vehicle side surfaces in the vehicle width direction. The reason for this arrangement is to ensure a wide vehicle cabin 28, or particularly, the intermediate area 29*c*.

Therefore, since the vehicle cabin 28 has a shape avoiding the storage part 30 as described above, it is required to reduce a height dimension H1 and a longitudinal dimension L3 of the storage part 30 so as to ensure a wide vehicle cabin 28. For reducing the height dimension H1 and the longitudinal dimension L3 while ensuring a sufficient capacity for the storage part 30, it is effective to increase a dimension D1 of the storage part 30 in the vehicle width direction. For increasing the dimension D1 of the storage part 30 in the vehicle width direction, as is apparent from FIG. 3, it is effective to increase a distance D2 from the right wheel 20 to the left wheel 20. Specifically, when the wheels 20 are arranged as far toward the outer side in the vehicle width direction as possible to increase the distance D2, the dimensions H1 and L3 of the storage part 30 can be reduced, and accordingly, a wide vehicle cabin 28 can be ensured.

As is apparent from FIG. 2, to ensure a wide vehicle longitudinal dimension L1 of the intermediate area 29c, it is effective to reduce the longitudinal dimension L3 of the storage part 30 and increase a distance L2 from the rear end of the front wheel 20f to the front end of the rear wheel 20r. Specifically, when the wheels 20 are arranged as far out on the outer side in the vehicle longitudinal direction as possible to increase the distance L2, the vehicle cabin 28 can accordingly be made wide.

As described above, in this example, the wheels 20 are arranged at positions close to the edges of the four corners of the vehicle 10 so as to ensure a wide vehicle cabin 28. In this arrangement, portions of wheel arches covering circumferential surfaces of the front wheels 20f constitute front bulging parts 32f bulging outward from the front and side surfaces of the vehicle 10. Similarly, portions of wheel arches covering circumferential surfaces of the rear wheels 20r constitute rear bulging parts 32r bulging outward from the rear and side surfaces of the vehicle 10. Therefore, in this example, the front bulging parts 32f made up of the body 12 bulging forward and laterally outward are formed on both sides in the vehicle width direction of the front surface of the vehicle 10, and the rear bulging parts 32r made up of the body 12 bulging rearward and laterally outward are formed on both sides in the vehicle width direction of the rear surface of the vehicle 10.

Each of the bulging parts 32 has a side surface 34 and a longitudinal outside surface 36 (see FIG. 3) as well as a connection surface 38 connecting the two surfaces 34, 36. In this example, the connection surface 38 is an inclined surface going outward in the vehicle width direction while extending toward the center in the vehicle longitudinal direction. A second sensor 42 is arranged on this inclined surface (the connection surface 38), which will be described later.

An object detection sensor mounted on the vehicle 10 will be described. As described above, the vehicle 10 of this example detects an object around the vehicle with sensors for drive assist or automatic driving. Multiple first sensors 40f, 40r, 40s and multiple second sensors 42f, 42r, 42a are disposed as the sensors for detecting an object on the vehicle 10.

The first sensors 40 are sensors used for detecting an object located at a middle/far distance (several meters to 100 meters). For example, lidar can be used as the first sensor 40. Lidar is an abbreviation for "Light Detection and Ranging" and is a sensor detecting an object and measuring a distance to an object with a remote sensing technique using light. The light used by the lidar is light having a wavelength in a range of about 10 μm to about 250 nm and includes light such as ultraviolet light, visible light, and infrared light. The lidar may include an optical system (such as a rotating mirror) for scanning with a laser beam for detection. In another form, the first sensors 40 may be radars detecting an object with radio waves, for example, a millimeter wave radar detecting an object with millimeter waves. Alternatively, the first sensors 40 may be infrared laser sensors detecting an object with infrared light.

Among the first sensors 40, a front first sensor 40f is disposed substantially at the center in the vehicle width direction on the front surface of the vehicle 10. A rear first sensor 40r is disposed substantially at the center in the vehicle width direction on the rear surface of the vehicle 10. Additionally, side first sensors 40s are disposed at positions on the side surfaces of the vehicle slightly behind the front bulging parts 32f. The front, rear, and side first sensors 40f, 40r, 40s may be sensors of the same type providing the same performance, or may have a slight difference in performance. For example, drive assist or automatic driving requires early detection of an object ahead, i.e., in the running direction of the vehicle 10. Therefore, the front first sensor 40f detecting an object ahead of the vehicle may have a wider detection range or higher detection resolution than the rear first sensor 40r and the side first sensors 40s. In other words, the rear first sensor 40r and the side first sensors 40s may be relatively inexpensive compared to the front first sensor 40f. As described above, by varying the performance of the first sensors 40 depending on an installation position and using the inexpensive first sensors 40 depending on a location, the cost of the first sensors 40 used in the entire vehicle 10 can be reduced.

Figure 4:
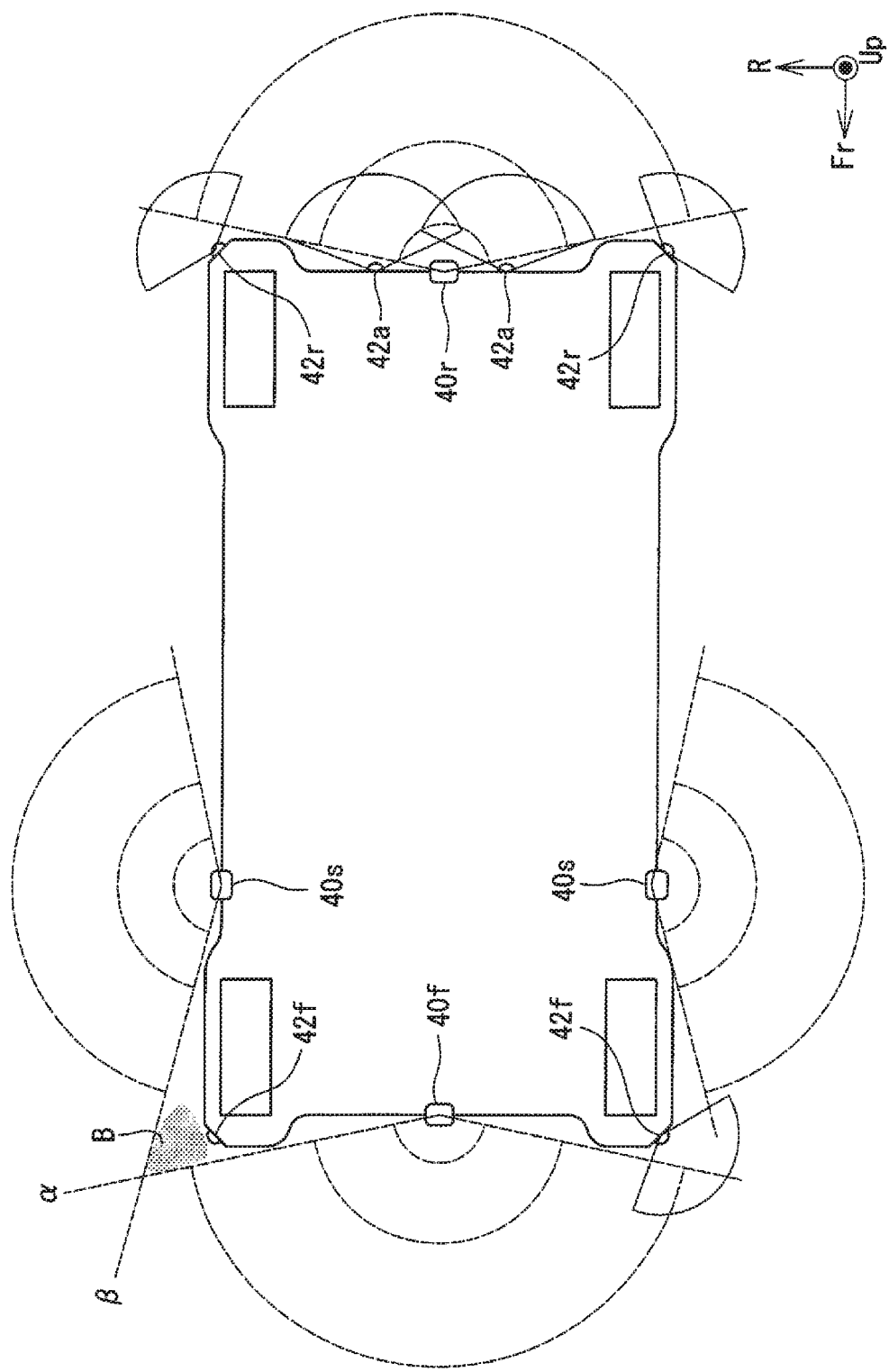
FIG. 4 is a schematic plan view of the vehicle, showing detection ranges of sensors.

As described above, in this example, the bulging parts 32 are disposed on both front sides and both rear sides of the vehicle. The bulging parts 32 protrude outward and therefore can be considered as parts more likely to hit an obstacle outside the vehicle than other parts. On the other hand, detection light or detection radio waves output from the first sensors 40 are blocked by the bulging parts 32, so that a blind spot of the first sensor 40 is easily formed around the bulging parts 32. This will be described with reference to FIG. 4. FIG. 4 is a schematic plan view of the vehicle 10, showing the detection ranges of the sensors. In FIG. 4, broken lines indicate the detection ranges of the first sensors 40, and thin solid lines indicate the detection ranges of the second sensors 42.

As is apparent from FIG. 4, the detection light or the detection radio wave output from the front first sensor 40f striking the bulging part 32 cannot further proceed, and therefore, the blind spot of the front first sensor 40f is formed behind a line α connecting the front first sensor 40f and a leading end of the front side of the front bulging part 32f. Similarly, the blind spot of the first side sensor 40s is formed on the center side in the vehicle width direction relative to a line β connecting the first side sensor 40s and a rear end of the front bulging part 32f. This results in a blind spot B in which the first sensors 40 cannot detect an object diagonally in front of the front bulging part 32f. On the other hand, the front bulging part 32f protrudes outward and is therefore more likely to hit an obstacle. To prevent a collision between the front bulging part 32f and another member, a sensor detecting an object in the blind spot B is required. Similarly, a sensor detecting an object around the rear bulging part 32r is also desired.

Therefore, in this example, the multiple second sensors 42 are disposed in addition to the multiple first sensors 40. As with the first sensors 40, the second sensors 42 are sensors detecting an object around the vehicle 10. However, the second sensors 42 may be inexpensive sensors having a smaller detection range than the first sensors 40. Specifically, the detection range of the second sensors 42 may be less than several meters. Therefore, for example, the second sensors 42 may be clearance sonars detecting an object with ultrasonic waves. Obviously, as with the first sensors 40, the second sensors 42 may be sensors detecting an object with light or radio waves.

In any case, in this example, the second sensors 42 are disposed on the connection surfaces 38 of the bulging parts 32. As described above, the connection surfaces 38 are inclined surfaces going outward in the vehicle width direction while extending toward the center in the vehicle longitudinal direction. The second sensors 42 disposed on the connection surfaces 38 (inclined surfaces) can properly detect objects diagonally in front of the front bulging parts 32f and diagonally behind the rear bulging parts 32r, which are likely to be in the blind spots B of the first sensors 40. This enables proper driving, or particularly, proper parking and right/left turns.

In this example, the auxiliary second sensors 42a are disposed on the rear surface of the vehicle 10 in addition to the front second sensors 42f and the rear second sensors 42r disposed on the front bulging parts 32f and the rear bulging parts 32r. There are two auxiliary second sensors 42a disposed in total respectively on both left and right sides of the rear first sensor 40r. The auxiliary second sensors 42a are used particularly for preventing collision when the vehicle 10 moves backward, such as when the vehicle 10 is parking.

As is apparent from the above description, in this example, a wide vehicle cabin space can be ensured by arranging the wheels 20 near the front end or the rear end of the vehicle 10. Accordingly, the bulging parts 32 bulges outward at the corners of the vehicle 10, and the blind spot B of the first sensors 40 is likely to be generated. However, since the second sensors 42 are arranged on the connection surfaces 38 of the bulging parts 32 in this example, an object in the blind spot B of the first sensors 40 can properly be detected. Therefore, according to this example, the object information around the vehicle can properly be acquired even though the vehicle 10 has the bulging parts 32.

Figure 5:
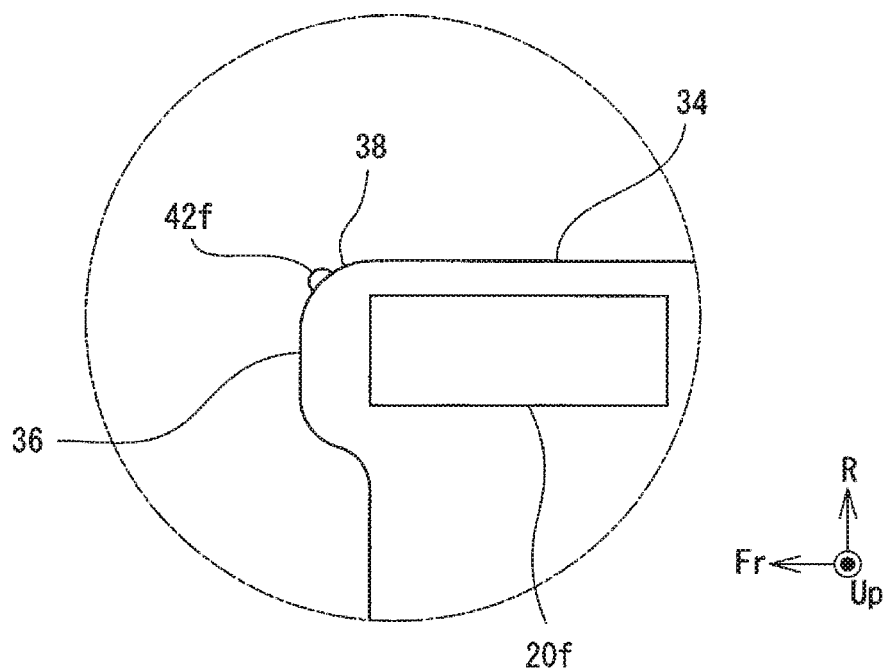
FIG. 5 is a view showing an example of another shape of a bulging portion.

Although not shown in the drawings, one or more sensors for confirming the position of the vehicle are disposed at the center of the roof of the vehicle 10 of this example. For example, lidar and GPS can be used for such sensors. The techniques disclosed in this description are merely examples, and as long as the vehicle includes at least the first sensor 40 disposed on the front or rear surface, the bulging parts 32 disposed on both sides in the vehicle width direction of the front or rear surface, and the second sensors 42 disposed on the connection surfaces 38 of the bulging parts 32, the other configurations may be changed. For example, although the bulging parts 32 are disposed on both the front side and the rear side of the vehicle 10 in this example, the bulging parts 32 may be disposed on only one side. The connection surface 38 of the bulging part 32 is not limited to the inclined surface and may be an outward convex round surface as shown in FIG. 5. Even if the second sensor 42 is attached to the R surface instead of the inclined surface, an object diagonally in front of or diagonally behind the bulging part 32 can be properly detected.

The first sensors 40 and the second sensors 42 described as sensors of different types in this example may be sensors of the same type. The side first sensors 40s and the auxiliary second sensors 42a disposed in the above description may not be included. Although the vehicle 10 has a box shape without a hood and a trunk in the above description, the techniques disclosed in this description may be applied to the vehicle 10 having another shape, for example, a sedan-type vehicle having a hood.

The invention claimed is:

1. A vehicle capable of drive assist or automatic driving, comprising:
   a first sensor disposed intermediately in a vehicle width direction on at least one of front and rear surfaces of the vehicle, and detecting an object therearound;
   bulging parts disposed on both sides of the at least one surface in the vehicle width direction and made up of a vehicle body bulging at least outward in a vehicle longitudinal direction;
   a connection surface that connects an outside surface in the vehicle width direction and an outside surface in the vehicle longitudinal direction of each of the bulging parts and that is an inclined surface going outward in the vehicle width direction while extending toward a center in the vehicle longitudinal direction, or a round surface convex toward the outside of the vehicle;
   a second sensor arranged on the connection surface and detecting an object therearound; and
   a side first sensor is disposed on an outside surface in the vehicle width direction on a center side in the vehicle longitudinal direction relative to the bulging parts;
   wherein:
   the bulging parts also bulge outward in the vehicle width direction;
   a blind spot is defined between a detection range of the first sensor on the at least one of the front and rear surfaces and a detection range of the side first sensor on the outside surface in the vehicle width direction;
   the second sensor is positioned within the blind spot; and
   a detection range of the second sensor extends within the blind spot and at least partially overlaps the detection range of the first sensor and the detection range of the side first sensor.

2. The vehicle according to claim 1, wherein the second sensor has a narrower detection range than the first sensor.

3. The vehicle according to claim 1, wherein the bulging parts at least partially form wheel arches in which wheels are housed, and wherein a position of an outer end of each of the wheels in the vehicle longitudinal direction is substantially the same as a position of the at least one surface in the vehicle longitudinal direction.

* * * * *